(12) United States Patent
Hwang et al.

(10) Patent No.: US 11,068,636 B2
(45) Date of Patent: Jul. 20, 2021

(54) METHOD FOR SEMICONDUCTOR PACKAGE AND SEMICONDUCTOR PACKAGE DESIGN SYSTEM

(71) Applicant: Samsung Electronics Co., Ltd., Suwon-si (KR)

(72) Inventors: Yoonjae Hwang, Yongin-si (KR); Sungwook Moon, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/835,423

(22) Filed: Mar. 31, 2020

(65) Prior Publication Data
US 2020/0320243 A1    Oct. 8, 2020

(30) Foreign Application Priority Data

Apr. 5, 2019  (KR) .................. 10-2019-0040290
Aug. 16, 2019  (KR) .................. 10-2019-0100538

(51) Int. Cl.
| | | |
|---|---|---|
| *G06F 30/392* | (2020.01) | |
| *H01L 23/498* | (2006.01) | |
| *H01L 23/522* | (2006.01) | |
| *G06F 30/373* | (2020.01) | |
| *H01L 25/065* | (2006.01) | |
| *H01L 25/00* | (2006.01) | |
| *H01L 21/48* | (2006.01) | |

(52) U.S. Cl.
CPC .......... *G06F 30/392* (2020.01); *G06F 30/373* (2020.01); *H01L 21/4846* (2013.01); *H01L 23/49827* (2013.01); *H01L 23/5228* (2013.01); *H01L 25/0657* (2013.01); *H01L 25/50* (2013.01)

(58) Field of Classification Search
CPC . G06F 30/392; G06F 30/373; H01L 21/4846; H01L 23/49827; H01L 23/5228; H01L 25/0657; H01L 25/50
USPC ........................................................ 716/118
See application file for complete search history.

(56) References Cited

U.S. PATENT DOCUMENTS

| | | |
|---|---|---|
| 6,952,814 B2 | 10/2005 | Joseph et al. |
| 8,191,034 B1 | 5/2012 | Mohan |
| 8,539,420 B2 | 9/2013 | Camarota |
| 8,898,365 B2 | 11/2014 | Masleid et al. |
| 9,106,229 B1 * | 8/2015 | Hutton .................. H01L 25/105 |
| 9,465,900 B2 | 10/2016 | Jeong et al. |
| 9,589,092 B2 | 3/2017 | Fang et al. |
| 2010/0257495 A1 | 10/2010 | Wu |
| 2013/0007692 A1 * | 1/2013 | Yeh ........................ G06F 30/367 |
| | | 716/136 |

(Continued)

*Primary Examiner* — Suresh Memula
(74) *Attorney, Agent, or Firm* — Muir Patent Law, PLLC

(57) ABSTRACT

A design method for a semiconductor package including a first chip, a second chip, a 2.5 dimensional (2.5D) interposer, a package substrate, and a board includes generating a layout including the 2.5D interposer on the package substrate and the first and second chips individually arranged on the 2.5D interposer, based on design information; analyzing signal integrity and power integrity between the first and second chips from the layout; analyzing signal integrity or power integrity between the first chip and at least one third chip on the board from the layout; and determining whether to modify the layout based on the analysis results.

20 Claims, 14 Drawing Sheets

(56) References Cited

U.S. PATENT DOCUMENTS

| | | | | |
|---|---|---|---|---|
| 2013/0139121 A1* | 5/2013 | Wu | ............... | G06F 30/39 |
| | | | | 716/113 |
| 2013/0212544 A1* | 8/2013 | Yu | ............... | G06F 30/30 |
| | | | | 716/55 |
| 2013/0246990 A1* | 9/2013 | Yen | ............... | G06F 30/367 |
| | | | | 716/112 |
| 2018/0165402 A1* | 6/2018 | Farooq | ............... | G06F 30/394 |

* cited by examiner

| Level | RELATIONSHIP | Characteristic | Electrical Property |
|---|---|---|---|
| Level-1 | - | SI | Impedance |
| | | | Skew |
| | | | Return loss |
| | | | Insertion loss |
| | | | X-talk |
| | | PI | SSN |
| | | | DC-R |
| | | | AC-Z |
| Level-2 | RELATIONSHIP-1 | SI | Capacitance |
| | | PI | DC-R |
| | | | AC-Z |
| | RELATIONSHIP-2 | PI | DC-R |
| | | | AC-Z |

| Level | RELATIONSHIP | Characteristic | Electrical Property | Physical Variable |
|---|---|---|---|---|
| Level-1 | — | SI | Impedance | Width, Height, Space, Dielectric constant |
| | | | Skew | Length, Impedance (or Dielectric constant) |
| | | | Return loss | Impedance |
| | | | Insertion loss | Length, Impedance, Dielectric loss |
| | | | X-talk | Length, Space, Impedance |
| | | PI | SSN | X-talk |
| | | | DC-R | Via No, Via R, TSV No, TSV R |
| | | | AC-Z | TSV No, TSV L |
| Level-2 | RELATIONSHIP-1 | SI | Capacitance | Mesh No, Mesh R, Mesh C, TSV No, TSV R, TSV C, Bump No, Bump Pitch |
| | | PI | DC-R | Via No, Via R, TSV No, TSV R |
| | | | AC-Z | TSV No, TSV C, TSV L |
| | RELATIONSHIP-2 | PI | DC-R | Via No, Via R, TSV No, TSV R |
| | | | AC-Z | TSV No, TSV L |

METHOD FOR SEMICONDUCTOR PACKAGE AND SEMICONDUCTOR PACKAGE DESIGN SYSTEM

CROSS-REFERENCE TO RELATED APPLICATIONS

This application claims the benefit of Korean Patent Application Nos. 10-2019-0040290, filed on Apr. 5, 2019, and 10-2019-0100538, filed on Aug. 16, 2019, in the Korean Intellectual Property Office, the disclosures of both of which are incorporated herein in their entireties by reference.

BACKGROUND

The inventive concept relates to a design method for a semiconductor package and, more specifically, to a design method of analyzing signal integrity and power integrity and designing a semiconductor package based on the analyzed signal integrity and power integrity, and a semiconductor package design system.

An existing process flow performed to design a semiconductor package is focused on only a planar die design, and thus, it is difficult to detect the influence caused by a stack structure in chips stacked on a 2.5 dimensional (2.5D) interposer or a chip having a plurality of dies stacked vertically. Accordingly, research into a design method suitable for a semiconductor package including the stack structure has been conducted.

SUMMARY

The inventive concept provides a method of detecting an influence to an overall design, which is caused by a stack structure of a semiconductor package including a 2.5 dimensional (2.5D) interposer or a plurality of dies stacked vertically, and designing the semiconductor package based on the influence in order to produce semiconductor packages having an improved function, and a semiconductor package design system.

According to an aspect of the inventive concept, there is provided a method of manufacturing a semiconductor package including a first chip, a second chip, a 2.5D interposer, a package substrate, and a board, the method including: generating a layout including the 2.5D interposer on the package substrate and the first and second chips individually arranged on the 2.5D interposer, based on design information; analyzing signal integrity and power integrity between the first and second chips from the layout; analyzing signal integrity or power integrity between the first chip and at least one third chip on the board from the layout; determining whether to modify the layout based on analysis results of the analyzing the signal integrity and the power integrity between the first and second chips and the analyzing the signal integrity or the power integrity between the first chip and at least one third chip on the board; and forming the semiconductor package including the first chip, the second chip, the 2.5 dimensional (2.5D) interposer, the package substrate, and the board, when it is determined not to modify the layout.

According to another aspect of the inventive concept, there is provided a method of manufacturing a semiconductor package including a first chip having a plurality of dies stacked vertically, a package substrate, and a board, the method including: generating a layout including the first chip on the package substrate; analyzing signal integrity and power integrity between the plurality of dies of the first chip from the layout; analyzing signal integrity or power integrity between the first chip and at least one second chip on the board from the layout; modifying the layout based on analysis results of the analyzing the signal integrity and the power integrity between the plurality of dies of the first chip and the analyzing the signal integrity or the power integrity between the first chip and at least one second chip on the board; and forming the semiconductor package including the first chip having a plurality of dies stacked vertically, the package substrate, and the board, based on the modified layout.

According to another aspect of the inventive concept, there is provided a design system for designing a semiconductor package including a first chip, a second chip, a 2.5D interposer, a package substrate, and a board, the design system including: a layout generating module configured to generate a first layout including the 2.5D interposer on the package substrate and the first and second chips individually arranged on the 2.5D interposer; an extracting module configured to extract first electrical properties and second electrical properties of a configuration of the 2.5D interposer from the first layout; a characteristic analyzing module configured to analyze signal integrity and power integrity between the first and second chips based on the extracted first electrical properties and analyze signal integrity or power integrity between the first chip and at least one third chip on the board based on the extracted second electrical properties; and a reviewing module configured to modify the first layout based on analysis results of the signal integrity and the power integrity between the first and second chips and the signal integrity or the power integrity between the first chip and at least one third chip on the board.

BRIEF DESCRIPTION OF THE DRAWINGS

Embodiments of the inventive concept will be more clearly understood from the following detailed description taken in conjunction with the accompanying drawings in which:

FIG. 5 is a table for describing a method of analyzing chip design level-specific characteristics, according to an example embodiment of the inventive concept;

FIG. 7 is a table for describing a method of analyzing chip design level-specific characteristics, according to an example embodiment of the inventive concept;

DETAILED DESCRIPTION OF THE EMBODIMENTS

Figure 1:
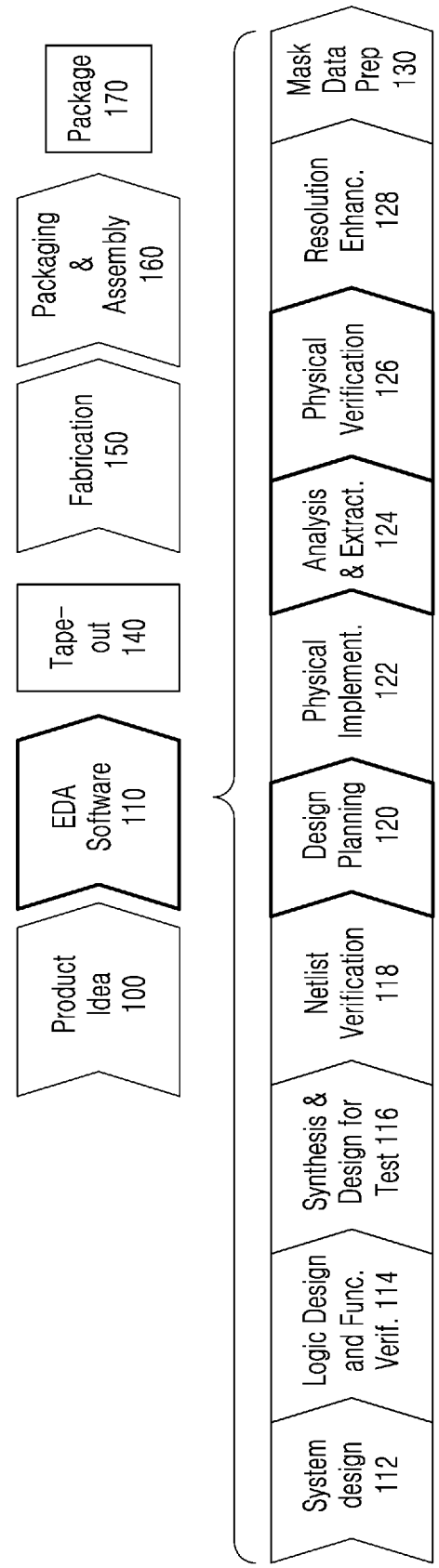
FIG. 1 illustrates a digital design flow of a design method for a semiconductor package, according to an example embodiment of the inventive concept.

Hereinafter, embodiments of the inventive concept will be described in detail with reference to the accompanying drawings. In the drawings, like numbers refer to like elements throughout. As is traditional in the field of the disclosed technology, features and embodiments are described, and illustrated in the drawings, in the term "module." As is traditional in the field of the disclosed technology, features and embodiments are described, and illustrated in the drawings, in terms of functional modules. Those skilled in the art will appreciate that these modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the modules being implemented by microprocessors or similar, they may be programmed using software (e.g., microcode) to perform various functions discussed herein and may optionally be driven by firmware and/or software. Alternatively, each module may be implemented by dedicated hardware, or as a combination of dedicated hardware to perform some functions and a processor (e.g., one or more programmed microprocessors and associated circuitry) to perform other functions.

In addition, according to some embodiments of the inventive concept, the module may be configured in an addressable storage medium or configured to be performed by at least one processor. Therefore, the module may include components such as software components, object-oriented software components, class components, and task components, processes, functions, attributes, procedures, subroutines, segments of program code, drivers, firmware, a microcode circuit, data, a database, data structures, tables, arrays, and variables.

FIG. 1 illustrates a digital design flow of a design method for a semiconductor package, according to an example embodiment of the inventive concept.

Referring to FIG. 1, at a high level, a process starts from a product idea (operation 100), and the process may be implemented through an electronic design automation (EDA) software design process (operation 110). Once a design is completed, the process may be taped out (operation 140). After the tape-out, a fabrication process may be performed (operation 150), followed by a packaging and assembly process (operation 160), and as a result, a completed semiconductor package (or semiconductor chip) may be fabricated (operation 170).

The EDA software design process (operation 110) may include a plurality of operations (operations 112 to 130). However, the operations (operations 112 to 130) shown in FIG. 1 are only illustrative, and thus the present embodiment is not limited thereto, and new operations may be further added, or arbitrary operations may be omitted. Hereinafter, the EDA software design process (operation 110) will be schematically described.

In system design (operation 112), a designer may perform what-if planning of describing a desired function to be implemented, refining the function, and checking costs. Hardware-software architecture segmentation may be performed in this operation.

In logic design and function verification (operation 114), very-high-speed integrated circuit (VHSIC) hardware description language (VHDL) or Verilog code for a module in a system may be recorded, and whether a function is correct with respect to a semiconductor package design may be checked. In detail, whether the semiconductor package design generates a correct output may be checked.

In synthesis and design for a test (operation 116), the VHDL/Verilog code may be converted into a netlist. The netlist may be optimized to meet a target technique. In addition, design and implementation of a plurality of tests may be performed to allow checking of the completed semiconductor package.

In netlist verification (operation 118), the netlist may be tested for compliance with timing constraints and the VHDL/Verilog code. In design planning (operation 120), an overall floorplan for the semiconductor package may be configured, and timing and top-priority routing for the semiconductor package may be analyzed. In physical implementation (operation 122), deployment (position determination of circuit elements) and routing (connection of circuit elements) may be achieved. In analysis and extraction (operation 124), a circuit function may be verified at a transistor level. In physical verification (operation 126), various test or inspection functions may be performed to ensure accuracy of fabrication, electrical issues, lithographic issues, and circuitry. In resolution enhancement (operation 128), a geometric fabrication of a layout may be performed to enhance design manufacturability. In mask data preparation (operation 130), "tape-out" data for mask production may be used to generate semiconductor packages including a lithographic integrated circuit.

In at least one of the design planning (operation 120), the analysis and extraction (operation 124), and the physical verification (operation 126), according to an example embodiment of the inventive concept in the design flow for designing a semiconductor package including a 2.5D interposer or a chip having a plurality of dies stacked vertically, an influence caused by a stack structure of the semiconductor package may be detected, and a design of the semiconductor package may be performed based on the detected influence.

In detail, in a design of a semiconductor package including a 2.5D interposer, signal integrity and power integrity between chips stacked on the 2.5D interposer may be analyzed, signal integrity or power integrity between the chips stacked on the 2.5D interposer and other chips stacked on the semiconductor package or a board may be analyzed, and the analysis results may be reflected on the design of the semiconductor package. In addition, in a design of a semiconductor package including a chip having a plurality of dies stacked vertically, signal integrity or power integrity between a plurality of dies included in each of chips on a package substrate may be analyzed, signal integrity or power integrity between the chips on the package substrate and other chips stacked on the semiconductor package or a board may be analyzed, and the analysis results may be reflected on the design of the semiconductor package.

Figure 2:
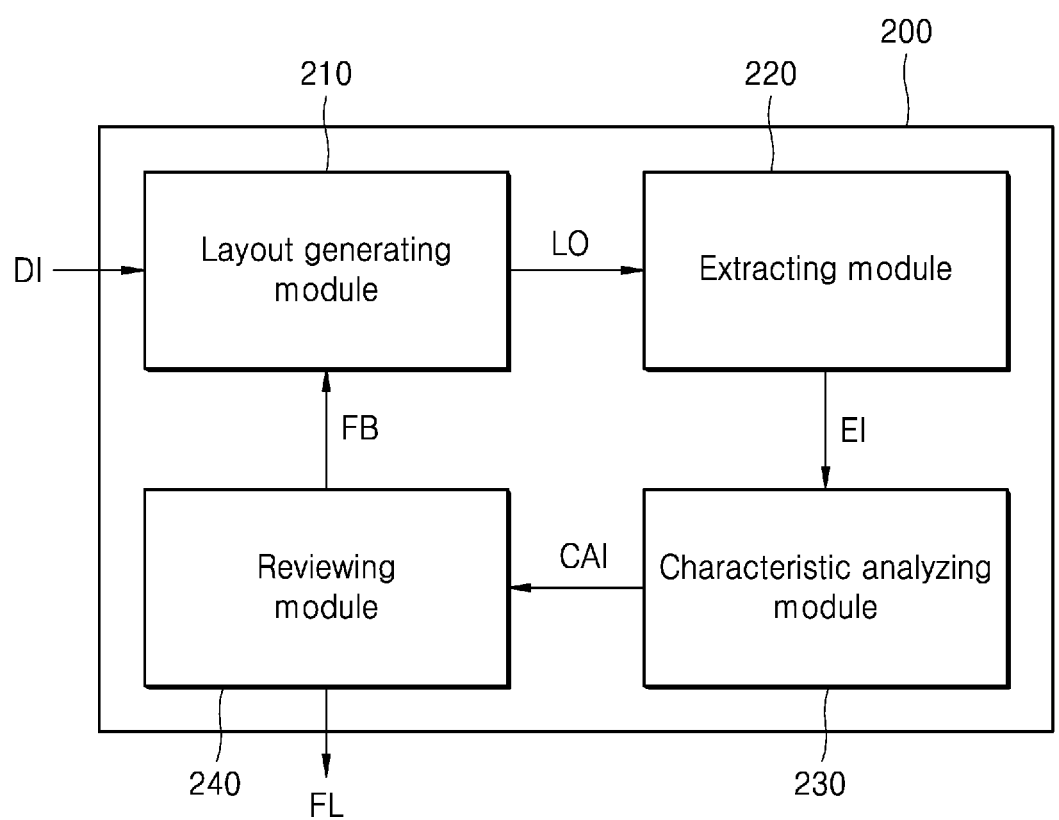
FIG. 2 is a block diagram of a semiconductor package design system, according to an example embodiment of the inventive concept.

FIG. 2 is a block diagram of a semiconductor package design system 200 according to an example embodiment of the inventive concept.

Referring to FIG. 2, the semiconductor package design system 200 may include a layout generating module 210, an extracting module 220, a characteristic analyzing module 230, and a reviewing module 240. The semiconductor package design system 200 may operate using a computing system. Each component constituting the semiconductor package design system 200 may be implemented to operate on the computing system.

The layout generating module 210 may generate a layout LO of a semiconductor package including a stack structure based on design information DI, and may provide the generated layout LO to the extracting module 220. According to an embodiment of the inventive concept, the semiconductor package may include a 2.5D interposer, a package substrate, a board, and a plurality of chips. According to another embodiment of the inventive concept, the semiconductor package may include a package substrate, a board, and at least one chip having a plurality of dies stacked vertically. As disclosed herein, the chips (e.g., the plurality of chips and the at least one cheap) may be memory chips and/or logic chips. The design information DI may include a layout parameter for each of components of the semiconductor package. According to some embodiments of the inventive concept, the layout parameter may be provided as a library. According to an example embodiment of the inventive concept, the layout generating module 210 may generate the layout LO by stacking the plurality of dies according to respective positions determined based on at least one of a temperature parameter, a power consumption parameter, and a noise parameter of each of the plurality of dies with respect to the chip having the plurality of dies stacked vertically.

The extracting module 220 may generate extraction information EI by extracting electrical properties of the stack structure of the semiconductor package from the layout LO and may provide the generated extraction information EI to the characteristic analyzing module 230. For example, when the semiconductor package includes the 2.5D interposer, the extracting module 220 may extract electrical properties of a configuration of the 2.5D interposer. As another example, when the semiconductor package includes the chip having the plurality of dies stacked vertically, the extracting module 220 may extract electrical properties of a configuration of the chip. The electrical properties of the configuration of the 2.5D interposer and the configuration of the chip having the plurality of dies stacked vertically will be described in detail with reference to FIG. 5.

The characteristic analyzing module 230 may generate characteristic information CAI by analyzing characteristics of the semiconductor package considering the stack structure based on the extraction information EI and provide the generated characteristic information CAI to the reviewing module 240. The characteristics of the semiconductor package considering the stack structure may include signal integrity or power integrity of the stack structure. According to an embodiment of the inventive concept, when the semiconductor package includes the 2.5D interposer, the characteristic analyzing module 230 may analyze signal integrity or power integrity between chips on the 2.5D interposer and analyze signal integrity or power integrity between the chips on the 2.5D interposer and at least one chip on the package substrate or the board. According to another embodiment of the inventive concept, when the semiconductor package includes the chip having the plurality of dies stacked vertically, the characteristic analyzing module 230 may analyze signal integrity or power integrity between the plurality of dies of the chip and analyze signal integrity or power integrity between the chip and another chip. A particular embodiment of analyzing signal integrity or power integrity will be described with reference to FIG. 5.

The reviewing module 240 may determine whether to modify the layout LO, based on the characteristic information CAI. In detail, the reviewing module 240 may determine whether the layout LO satisfies a sign-off condition, by referring to the characteristic information CAI, and determine whether to modify the layout LO, based on the determination result. In some embodiments, a sign-off condition may reflect whether or not one or more conditions for approval have been met, thereby allowing further processing. When the layout LO does not satisfy the sign-off condition, the reviewing module 240 may determine to modify the layout LO, generate feedback FB necessary to modify or re-generate the layout LO, and provide the generated feedback FB to the layout generating module 210. The feedback FB may include design information necessary to improve signal integrity or power integrity related to the stack structure of the semiconductor package. When the layout LO satisfies the sign-off condition, the reviewing module 240 may determine not to modify the layout LO, determine the layout LO as a final layout FL, and proceed to a next design operation by using the final layout FL.

By the method described above, the semiconductor package design system 200, according to an example embodiment of the inventive concept, may analysize characteristics of the stack structure by considering the stack structure and reflect the analysis result on a design. By detecting an influence caused by a stack structure of a semiconductor package when performing a design for the semiconductor package, a semiconductor package having improved performance may be fabricated.

Figure 3:
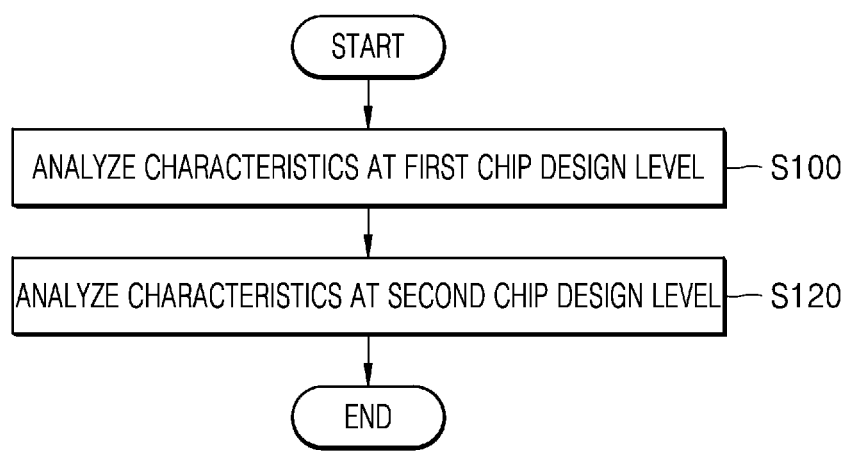
FIG. 3 is a flowchart of a design method for a semiconductor package, according to an example embodiment of the inventive concept.

FIG. 3 is a flowchart of a design method for a semiconductor package, according to an example embodiment of the inventive concept. In FIG. 3, a method for analyzing characteristics by considering a stack structure of a semiconductor package will be mainly described.

Referring to FIG. 3, a semiconductor package design system may analyze characteristics of a semiconductor package at a first chip design level (S100), and analyze characteristics thereof at a second chip design level (S120). The first chip design level of the semiconductor package may be differently defined according to configurations of the semiconductor package.

For example, when the semiconductor package includes a 2.5D interposer, a level corresponding to a relationship between chips stacked on the 2.5D interposer may be defined as the first chip design level. In operation S100, the semiconductor package design system may extract first electrical properties of a configuration of the 2.5D interposer, and may analyze characteristics of the first chip design level based on the extracted first electrical properties. The configuration of the 2.5D interposer for extracting the first electrical properties may include a plurality of through silicon vias (TSVs), a plurality of vias, and a plurality of metal lines for connection of chips on the 2.5D interposer.

However, this configuration is only illustrative, and thus, the present embodiment is not limited thereto, and the 2.5D interposer may further include various configurations. In addition, a level corresponding to a relationship between the chips stacked on the 2.5D interposer and a chip stacked on a package substrate or a board may be defined as the second chip design level. In this case, in operation S120, the semiconductor package design system may extract second electrical properties of the configuration of the 2.5D interposer, and may analyze characteristics of the second chip design level based on the extracted second electrical properties. The configuration of the 2.5D interposer for extracting the second electrical properties may include a plurality of TSVs, a plurality of vias, a plurality of meshes, and a plurality of bumps for connection between the package substrate or the board and the chips on the 2.5D interposer. The mesh may correspond to a stripe of a metal layer included in the 2.5D interposer. However, this configuration is only illustrative, and thus, the present embodiment is not limited thereto, and the 2.5D interposer may further include various configurations.

As another example, when the semiconductor package includes a chip having a plurality of dies stacked vertically, a level corresponding to a relationship between the plurality of dies in the chip may be defined as the first chip design level. In operation S100, the semiconductor package design system may extract first electrical properties of a configuration of the chip, and may analyze characteristics of the first chip design level based on the extracted first electrical properties. The configuration of the chip for extracting the first electrical properties may include a plurality of TSVs, a plurality of vias, and a plurality of metal lines corresponding to the plurality of dies, respectively. However, this configuration is only illustrative, and thus, the present embodiment is not limited thereto, and the chip may include other various configurations. In addition, a level corresponding to a relationship between the chip having the plurality of dies stacked vertically and another chip stacked on a package substrate or a board may be defined as the second chip design level. In this case, in operation S120, the semiconductor package design system may extract second electrical properties of the configuration of the chip, and may analyze characteristics of the second chip design level based on the extracted second electrical properties. The configuration of the chip for extracting the second electrical properties may include components for communication between the plurality of dies in the chip and another chip or components for supplying power to the plurality of dies. The first electrical properties and the second electrical properties will be described in detail with reference to FIG. 5.

Figure 4A:
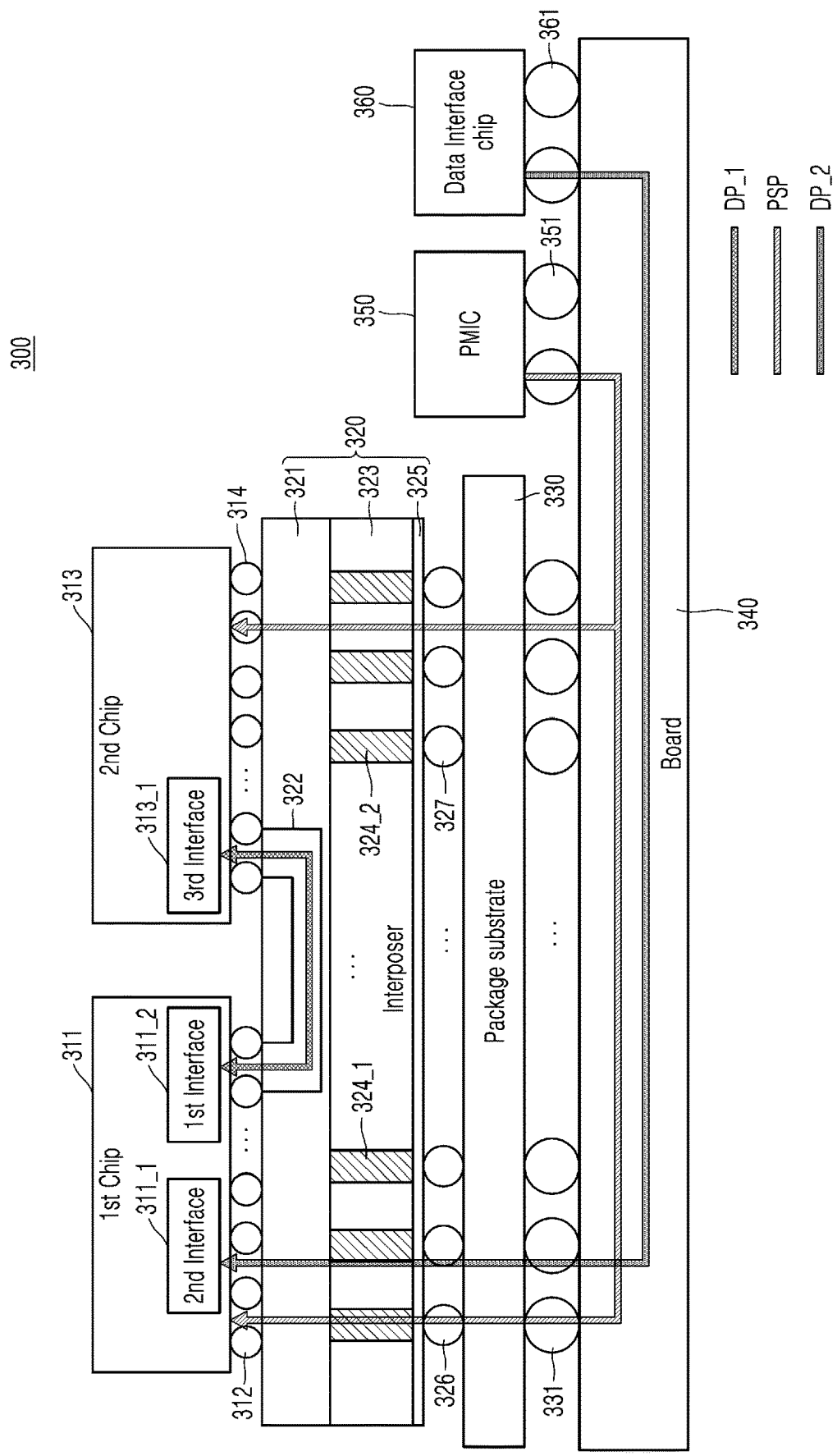
FIGS. 4A and 4B are implementation examples of a semiconductor package design including a stack structure to describe a semiconductor package design method, according to an example embodiment of the inventive concept.
Figure 4B:
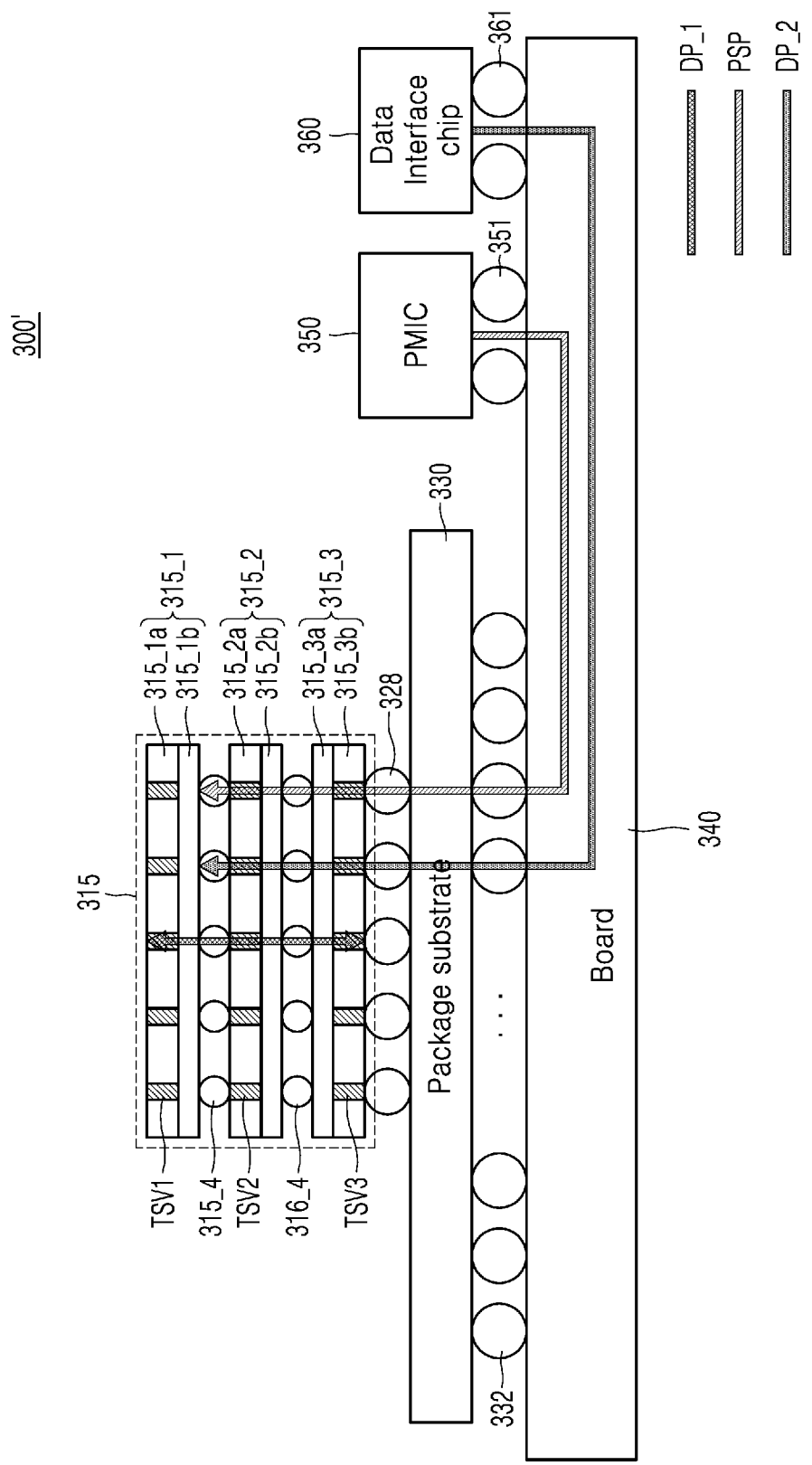

FIGS. 4A and 4B are implementation examples of a semiconductor package design including a stack structure to describe a semiconductor package design method, according to an example embodiment of the inventive concept. However, FIGS. 4A and 4B show illustrative implementation examples of semiconductor packages designed by applying the technical idea of the inventive concept, and it will be sufficiently understood that embodiments of the inventive concept are not limited thereto.

Referring to FIG. 4A, a semiconductor package 300 may include a first chip 311, a second chip 313, microbumps 312 and 314, a 2.5D interposer 320, interconnect bumps 326 and 327, a package substrate 330, a plurality of ball grid arrays 331, 351, and 361, a board 340, a power management integrated circuit (PMIC) 350, and a data interface chip 360. The first chip 311 and the second chip 313 may include semiconductor chips performing different operations, and for example, the first chip 311 may be a processor, and the second chip 313 may be a memory. The 2.5D interposer 320 may include a front layer 321, a substrate 323, and a back layer 325. According to an embodiment of the inventive concept, the 2.5D interposer 320 may include a back end of the line (BEOL) structure. According to some embodiments of the inventive concept, the 2.5D interposer 320 may include a front end of the line (FEOL) structure. In addition, according to some embodiments of the inventive concept, the front layer 321 may be referred to as a metal layer. The first chip 311 and the second chip 313 may be stacked on the front layer 321 of the 2.5D interposer 320 through the microbumps 312 and 314, respectively, and the first chip 311, the second chip 313, and the 2.5D interposer 320 may form a stack structure. The substrate 323 may be formed of silicon, glass, or the like and may include a plurality of TSVs 324_1 and 324_2. Active circuits in the first chip 311 and the second chip 313 may be connected to the TSVs 324_1 and 324_2 through metal lines 322 formed in the front layer 321 and the microbumps 312 and 314. In addition, the first chip 311 and the second chip 313 may communicate with each other through a first data path DP_1 formed in the 2.5D interposer 320, a first interface 311_2 formed in the first chip 311, and a third interface 313_1 formed in the second chip 313.

The back layer 325 of the 2.5D interposer 320 may be connected to the package substrate 330 through the interconnect bumps 326 and 327. According to an example embodiment of the inventive concept, the interconnect bumps 326 and 327 may include solder balls. The package substrate 330 may be connected to the board (e.g., printed circuit board (PCB)) 340 through a plurality of ball grid arrays 331. The PMIC 350 and the data interface chip 360 may also be connected to the board 340 through a plurality of ball grid arrays 351 and 361. According to an example embodiment of the inventive concept, the PMIC 350 may supply power to the first chip 311 through a power supply path PSP formed in the 2.5D interposer 320, the package substrate 330, and the board 340. In addition, the data interface chip 360 and the first chip 311 may communicate with each other through a second data path DP_2 formed in the 2.5D interposer 320, the package substrate 330, and the board 340 and a second interface 311_1. According to some embodiments of the inventive concept, the data interface chip 360 may be implemented by a serializer/deserializer (SerDes) chip for data communication.

The first chip design level in FIG. 4A, according to an example embodiment of the inventive concept, may be a level corresponding to a relationship between the first chip 311 and the second chip 313. For example, communication between the first chip 311 and the second chip 313 may be performed through the first data path DP_1 based on a memory interface (e.g., high-speed parallel interface (HPI), and in this case, signal integrity and power integrity of the memory interface (i.e., an interface between the first chip 311 and the second chip 313) may correspond to particularly relevant factors in a design of the 2.5D interposer 320. However, the first data path DP_1 is schematically shown for convenience of description, and thus, the present embodiment is not limited thereto, and the first data path DP_1 that is actually formed may differ from that shown in FIG. 4A.

The semiconductor package design system may extract first electrical properties of a configuration of the 2.5D interposer 320 connecting the first chip 311 to the second chip 313, and may analyze characteristics of the first chip design level based on the extracted first electrical properties.

For example, the characteristics of the first chip design level may include at least one of signal integrity and power integrity between the first chip 311 and the second chip 313. In addition, for example, the configuration of the 2.5D interposer 320 for extracting the first electrical properties may include the plurality of TSVs 324_1 and 324_2 (or at least some of the TSVs 324_1 and 324_2), a plurality of vias (not shown), and a plurality of metal lines 322 which form the first data path DP_1. However, this configuration is only illustrative, and thus, the present embodiment is not limited thereto, and the first electrical properties may be extracted from various configurations of the 2.5D interposer 320.

In addition, the second chip design level in FIG. 4A may be a level corresponding to a relationship between the first chip 311 and the PMIC 350 or between the first chip 311 and the data interface chip 360. With respect to power supply between the first chip 311 and the PMIC 350, system level power integrity through the power supply path PSP may correspond to a particularly relevant factor in a design of the 2.5D interposer 320. In addition, communication between the first chip 311 and the data interface chip 360 may be performed through the second data path DP_2 based on a memory interface (e.g., HSI), and in this case, signal integrity and power integrity of the memory interface (i.e., an interface between the first chip 311 and the data interface chip 360) may correspond to particularly relevant factors in a design of the 2.5D interposer 320. However, the power supply path PSP and the second data path DP_2 are schematically shown for convenience of description, and thus, the present embodiment is not limited thereto, and the power supply path PSP and the second data path DP_2 that are actually formed may differ from those shown in FIG. 4A.

The semiconductor package design system may extract second electrical properties of a configuration of the 2.5D interposer 320 connecting the first chip 311 to the PMIC 350 or a configuration of the 2.5D interposer 320 connecting the first chip 311 to the data interface chip 360, and may analyze characteristics of the second chip design level based on the extracted second electrical properties. For example, the characteristics of the second chip design level may include power integrity between the first chip 311 and the PMIC 350 or at least one of signal integrity and power integrity between the first chip 311 and the data interface chip 360. For example, the configuration of the 2.5D interposer 320 for extracting the second electrical properties may include the plurality of TSVs 324_1 and 324_2 (or at least some of the TSVs 324_1 and 324_2), a plurality of vias (not shown), a plurality of meshes (not shown), and a plurality of interconnect bumps 326 and 327 (or at least some of the interconnect bumps 326 and 327) which form the power supply path PSP or the second data path DP_2. However, this configuration is only illustrative, and thus, the present embodiment is not limited thereto, and the second electrical properties may be extracted from various configurations of the 2.5D interposer 320.

Referring to FIG. 4B, a semiconductor package 300' may include a third chip 315, interconnect bumps 328, the package substrate 330, a plurality of ball grid arrays 332, 351, and 361, the board 340, the PMIC 350, and the data interface chip 360. The third chip 315 may include a plurality of dies, e.g., first to third dies 315_1 to 315_3 stacked vertically, and a plurality of microbumps, e.g., first and second microbumps 315_4 and 316_4. For example, the first to third dies 315_1 to 315_3 may be stacked according to positions determined based on at least one of a temperature parameter, a power consumption parameter, and a noise parameter of each of the first to third dies 315_1 to 315_3.

According to some embodiments of the inventive concept, the third chip 315 may be implemented by a high bandwidth memory (HBM) chip. A stack structure may be formed by arranging the second die 315_2 under the first die 315_1 and arranging the third die 315_3 under the second die 315_2. According to some embodiments of the inventive concept, the first to third dies 315_1 to 315_3 may be referred to as semiconductor chips. Each of the first to third dies 315_1 to 315_3 may include a BEOL or FEOL structure. Particularly, the first die 315_1 may include a first semiconductor layer 315_1a and a second semiconductor layer 315_1b, the second die 315_2 may include a third semiconductor layer 315_2a and a fourth semiconductor layer 315_2b, and the third die 315_3 may include a fifth semiconductor layer 315_3a and a sixth semiconductor layer 315_3b. According to some embodiments of the inventive concept, the second semiconductor layer 315_1b, the fourth semiconductor layer 315_2b, and the fifth semiconductor layer 315_3a may be referred to as metal layers.

The first semiconductor layer 315_1a may include a plurality of first TSVs TSV1, and the second semiconductor layer 315_1b may include a plurality of vias (not shown) and a plurality of metal lines (not shown). The first die 315_1 may be connected to the second die 315_2 through the first microbumps 315_4. The third semiconductor layer 315_2a may include a plurality of second TSVs TSV2, and the fourth semiconductor layer 315_2b may include a plurality of vias (not shown) and a plurality of metal lines (not shown). The second die 315_2 may be connected to the third die 315_3 through the second microbumps 316_4. The fifth semiconductor layer 315_3a may include a plurality of vias (not shown) and a plurality of metal lines (not shown), and the sixth semiconductor layer 315_3b may include a plurality of third TSVs TSV3.

The first chip design level in FIG. 4B according to an example embodiment of the inventive concept may be a level corresponding to a relationship between the first to third dies 315_1 to 315_3 in the third chip 315. Signal integrity and power integrity between the first to third dies 315_1 to 315_3 may correspond to particularly relevant factors in a design of the third chip 315.

The semiconductor package design system may extract first electrical properties of a configuration of the third chip 315 connecting the first to third dies 315_1 to 315_3, and may analyze characteristics of the first chip design level based on the extracted first electrical properties. For example, the characteristics of the first chip design level may include at least one of the signal integrity and the power integrity between the first to third dies 315_1 to 315_3. In addition, for example, the configuration of the third chip 315 for extracting the first electrical properties may include the plurality of TSVs TSV1, TSV2, and TSV3 (or at least some of the TSVs TSV1, TSV2, and TSV3), a plurality of vias (not shown), and a plurality of metal lines (not shown) which form the first data path DP_1. However, this configuration is only illustrative, and thus, the present embodiment is not limited thereto, and the first electrical properties may be extracted from various configurations of the third chip 315.

In addition, the second chip design level in FIG. 4B may be a level corresponding to a relationship between the third chip 315 and the PMIC 350 or between the third chip 315 and the data interface chip 360. With respect to power supply through the power supply path PSP between the first to third dies 315_1 to 315_3 and the PMIC 350, system level power integrity may correspond to a particularly relevant factor in a design of the third chip 315. In addition, signal integrity and power integrity in communication between the first to third dies 315_1 to 315_3 in the third chip 315 and the data interface chip 360 may correspond to particularly relevant factors in a design of the third chip 315. However, the power supply path PSP and the second data path DP_2 are schematically shown for convenience of description, and thus, the present embodiment is not limited thereto, and the power supply path PSP and the second data path DP_2 that are actually formed may differ from those shown in FIG. 4B.

The semiconductor package design system may extract second electrical properties of a configuration of the third chip 315 connecting the first to third dies 315_1 to 315_3 to the PMIC 350 or a configuration of the third chip 315 connecting the first to third dies 315_1 to 315_3 to the data interface chip 360, and may analyze characteristics of the second chip design level based on the extracted second electrical properties. For example, the characteristics of the second chip design level may include power integrity between the third chip 315 and the PMIC 350 or at least one of signal integrity and power integrity between the third chip 315 and the data interface chip 360. For example, the configuration of the third chip 315 for extracting the second electrical properties may include the plurality of TSVs TSV1, TSV2, and TSV3 (or at least some of the TSVs TSV1, TSV2, and TSV3), a plurality of vias (not shown), a plurality of meshes (not shown), and a plurality of interconnect bumps 328 (or at least some of the interconnect bumps 328) which form the power supply path PSP or the second data path DP_2. However, this configuration is only illustrative, and thus, the present embodiment is not limited thereto, and the second electrical properties may be extracted from various configurations of the third chip 315.

Although not shown, a semiconductor package including a 2.5D interposer and a chip having a plurality of dies stacked vertically on the 2.5D interposer may be designed, and in this case, both the embodiments of FIGS. 4A and 4B may be applied to the design, and a detail description thereof is omitted herein because the detail description could be sufficiently understood by those of ordinary skill in the art.

FIG. 5 is a table TB1 for describing a method of analyzing chip design level-specific characteristics, according to an example embodiment of the inventive concept. However, the table TB1 is merely one example for describing the idea of the inventive concept, and thus the present embodiment is not limited thereto, and various electrical properties may be extracted to analyze characteristics.

Referring to FIG. 5, a semiconductor package design system may analyze characteristics of a first chip design level Level-1 and characteristics of a second chip design level Level-2 based on electrical properties. Particularly, the characteristics of the first chip design level Level-1 (e.g., the level corresponding to the relationship between the first chip 311 and the second chip 313 in FIG. 4A or the level corresponding to the relationship between the first to third dies 315_1 to 315_3 in the third chip 315 in FIG. 4B) may include signal integrity SI and power integrity PI. First electrical properties extracted to analyze the SI may include impedance, skew, return loss, insertion loss, and crosstalk (X-talk) of a stack structure (e.g., the configuration of the 2.5D interposer 320 in FIG. 4A or the configuration of the third chip 315 in FIG. 4B) of a semiconductor package. First electrical properties extracted to analyze the PI may include simultaneous switching noise (SSN), direct current resistance (DC-R), and alternating current impedance (AC-Z) of a stack structure (e.g., the configuration of the 2.5D interposer 320 in FIG. 4A or the configuration of the third chip 315 in FIG. 4B) of a semiconductor package.

Characteristics corresponding to a first relationship Relationship-1 of the second chip design level Level-2 (e.g., the level corresponding to the relationship between the first chip 311 and the data interface chip 360 in FIG. 4A or the level corresponding to the relationship between the third chip 315 and the data interface chip 360 in FIG. 4B) may include SI and PI. Second electrical properties extracted to analyze the SI may include capacitance of a stack structure (e.g., the configuration of the 2.5D interposer 320 in FIG. 4A or the configuration of the third chip 315 in FIG. 4B) of a semiconductor package. Second electrical properties extracted to analyze the PI may include DC-R and AC-Z of a stack structure (e.g., the configuration of the 2.5D interposer 320 in FIG. 4A or the configuration of the third chip 315 in FIG. 4B) of a semiconductor package.

Characteristics corresponding to a second relationship Relationship-2 of the second chip design level Level-2 (e.g., the level corresponding to the relationship between the first chip 311 and the PMIC 350 in FIG. 4A or the level corresponding to the relationship between the third chip 315 and the PMIC 350 in FIG. 4B) may include PI. Second electrical properties extracted to analyze the PI may include DC-R and AC-Z of a stack structure (e.g., the configuration of the 2.5D interposer 320 in FIG. 4A or the configuration of the third chip 315 in FIG. 4B) of a semiconductor package.

Figure 6:
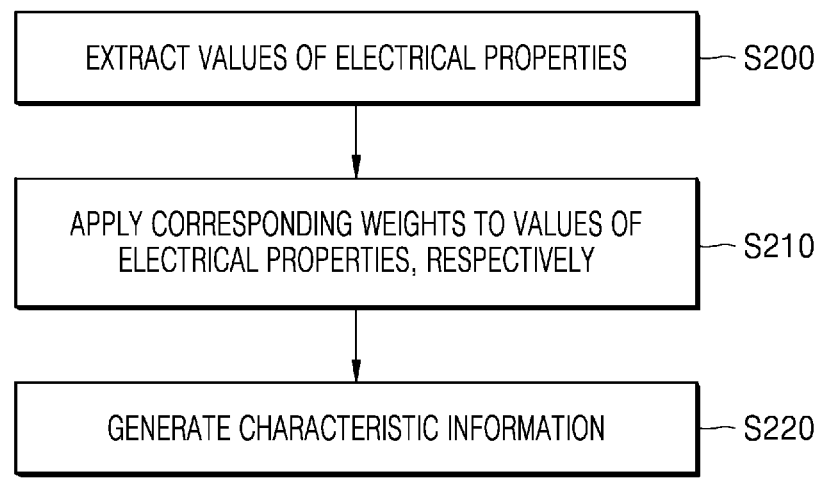
FIG. 6 is a flowchart of a method, performed by a semiconductor package design system, of generating characteristic information, according to an example embodiment of the inventive concept.

FIG. 6 is a flowchart of a method, performed by a semiconductor package design system, of generating characteristic information, according to an example embodiment of the inventive concept.

Referring to FIG. 6, the semiconductor package design system may extract values of electrical properties of a stack structure of a semiconductor package in operation S200. The semiconductor package design system may apply corresponding weights to the values of the electrical properties, respectively, in operation S210. For example, referring to FIG. 5 for a particular description, the semiconductor package design system may assign, to the insertion loss of the stack structure of the semiconductor package, a larger weight than those assigned to the other electrical properties in order to analyze the SI of the first chip design level Level-1. In addition, the semiconductor package design system may assign, to the AC-Z of the stack structure of the semiconductor package, a larger weight than those assigned to the other electrical properties in order to analyze the PI corresponding to the first relationship Relationship-1 of the second chip design level Level-2. However, this weight assignment is only illustrative, and thus, the present embodiment is not limited thereto, and various weights may be applied to the electrical properties when the characteristics are analyzed. The semiconductor package design system may generate characteristic information indicating characteristics of a certain chip design level based on the electrical properties to which the weights are applied in operation S220.

FIG. 7 is a table TB2 for describing a method of analyzing chip design level-specific characteristics, according to an example embodiment of the inventive concept. However, the table TB2 is merely one example for describing the idea of the inventive concept, and thus the present embodiment is not limited thereto, and electrical properties may be extracted based on various physical variables.

Referring to FIG. 7, a semiconductor package design system may extract electrical properties based on corresponding physical variables of a stack structure of a semiconductor package.

Physical variables used to extract the first electrical properties for analyzing the SI of the first chip design level Level-1 will now be described.

The impedance may be extracted based on physical variables such as a width and a height of metal lines of the stack structure of the semiconductor package (e.g., the metal lines 322 in FIG. 4A or metal lines of a plurality of semiconductor layers 315_1*b*, 315_2*b*, and 315_3*a* in FIG. 4B), a space between the metal lines, and a dielectric constant of the metal lines.

The skew may be extracted based on physical variables such as a length and an impedance (or the dielectric constant) of the metal lines of the stack structure of the semiconductor package (e.g., the metal lines 322 in FIG. 4A or metal lines of the plurality of semiconductor layers 315_1*b*, 315_2*b*, and 315_3*a* in FIG. 4B).

The return loss may be extracted based on physical variables such as the impedance of the metal lines of the stack structure of the semiconductor package (e.g., the metal lines 322 in FIG. 4A or metal lines of the plurality of semiconductor layers 315_1*b*, 315_2*b*, and 315_3*a* in FIG. 4B).

The insertion loss may be extracted based on physical variables such as the length, the impedance, and dielectric loss of the metal lines of the stack structure of the semiconductor package (e.g., the metal lines 322 in FIG. 4A or metal lines of the plurality of semiconductor layers 315_1*b*, 315_2*b*, and 315_3*a* in FIG. 4B).

The X-talk may be extracted based on physical variables such as the length of the metal lines of the stack structure of the semiconductor package (e.g., the metal lines 322 in FIG. 4A or metal lines of the plurality of semiconductor layers 315_1*b*, 315_2*b*, and 315_3*a* in FIG. 4B), the space between the metal lines, and the impedance of the metal lines.

Physical variables used to extract the first electrical properties for analyzing the PI of the first chip design level Level-1 will now be described.

The SSN may be extracted based on physical variables such as X-talk occurring in the stack structure of the semiconductor package.

The DC-R may be extracted based on physical variables such as the number of vias (Via No), a resistance of the vias (Via R), the number of TSVs (TSV No), and a resistance of the TSVs (TSV R) of the stack structure of the semiconductor package (e.g., the 2.5D interposer 320 in FIG. 4A or the third chip 315 in FIG. 4B).

The AC-Z may be extracted based on physical variables such as the TSV No and an inductance of the TSVs (TSV L) of the stack structure of the semiconductor package (e.g., the 2.5D interposer 320 in FIG. 4A or the third chip 315 in FIG. 4B).

Physical variables used to extract the second electrical properties for analyzing the signal integrity SI corresponding to the first relationship Relationship-1 of the second chip design level Level-2 will now be described.

The capacitance may be extracted based on physical variables such as the number of meshes (Mesh No), a resistance of the meshes (Mesh R), a capacitance of the meshes (Mesh C), the TSV No, the TSV R, a capacitance of the TSVs (TSV C), the number of interconnect bumps (Bump No), and a pitch between the interconnect bumps (Bump Pitch) of the stack structure of the semiconductor package (e.g., the 2.5D interposer 320 in FIG. 4A or the third chip 315 in FIG. 4B).

Physical variables used to extract the second electrical properties for analyzing the PI corresponding to the first relationship Relationship-1 of the second chip design level Level-2 will now be described.

The DC-R may be extracted based on physical variables, such as the Via No, the Via R, the TSV No, and the TSV R, of the stack structure of the semiconductor package (e.g., the 2.5D interposer 320 in FIG. 4A or the third chip 315 in FIG. 4B).

The AC-Z may be extracted based on physical variables such as the TSV No, the TSV C, and an inductance of the TSV (TSV L) of the stack structure of the semiconductor package (e.g., the 2.5D interposer 320 in FIG. 4A or the third chip 315 in FIG. 4B).

Physical variables used to extract the second electrical properties for analyzing the PI corresponding to the second relationship Relationship-2 of the second chip design level Level-2 will now be described.

The DC-R may be extracted based on physical variables, such as the Via No, the Via R, the TSV No, and the TSV R, of the stack structure of the semiconductor package (e.g., the 2.5D interposer 320 in FIG. 4A or the third chip 315 in FIG. 4B).

The AC-Z may be extracted based on physical variables such as the TSV No and the TSV L of the stack structure of the semiconductor package (e.g., the 2.5D interposer 320 in FIG. 4A or the third chip 315 in FIG. 4B).

Figure 8:
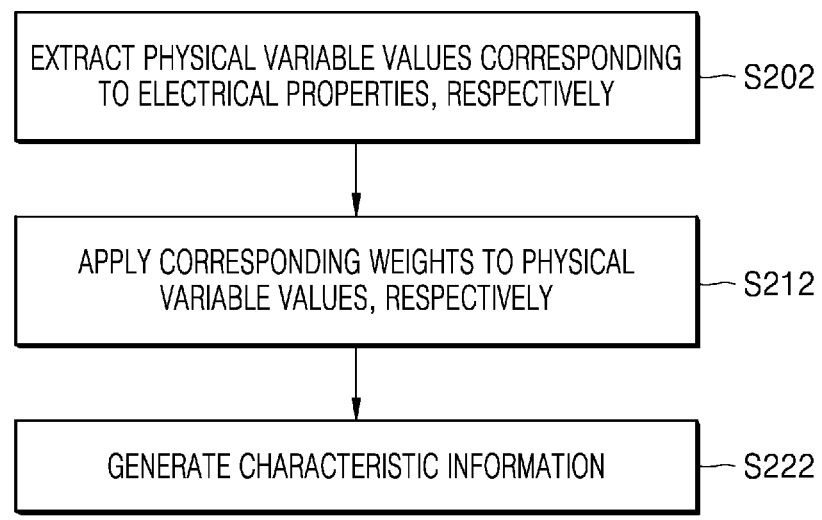
FIG. 8 is a flowchart of a method, performed by a semiconductor package design system, of generating characteristic information, according to an example embodiment of the inventive concept.

FIG. 8 is a flowchart of a method, performed by a semiconductor package design system, of generating characteristic information, according to an example embodiment of the inventive concept.

Referring to FIG. 8, the semiconductor package design system may acquire physical variable values corresponding to each of a plurality of electrical properties of a stack structure of a semiconductor package in operation S202. The semiconductor package design system may apply corresponding weights to the physical variable values, respectively, in operation S212. For example, referring to FIG. 7 for a particular description, the semiconductor package design system may assign, to a length of metal lines, a larger weight than those assigned to the other physical variables in order to extract insertion loss to be used to analyze the SI of the first chip design level Level-1. The semiconductor package design system may assign, to TSV No, Bump No, and Bump Pitch, a larger weight than those of the other physical variables in order to extract a capacitance to be used to analyze the SI corresponding to the first relationship Relationship-1 of the second chip design level Level-2. In addition, the semiconductor package design system may assign, to TSV C, a larger weight than those of the other physical variables in order to extract AC-Z to be used to analyze the PI corresponding to the first relationship Relationship-1 of the second chip design level Level-2. However, this weight assignment is only illustrative, and thus, the present embodiment is not limited thereto, and various weights may be applied to the electrical properties when the electrical properties are extracted. The semiconductor package design system may extract electrical properties based on the weight-applied physical variables and generate characteristic information indicating characteristics of a certain chip design level by using the extracted electrical properties in operation S222.

Figure 9:
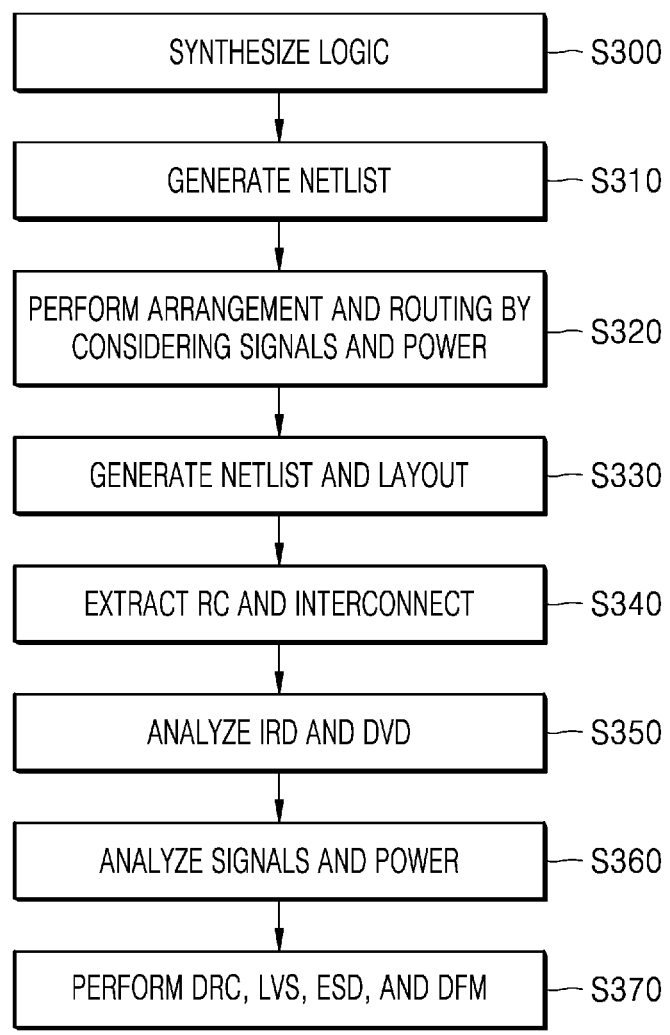
FIG. 9 is a flowchart of a method of designing a semiconductor package including a 2.5 dimensional (2.5D) interposer, according to an example embodiment of the inventive concept.

FIG. 9 is a flowchart of a method of designing a semiconductor package including a 2.5D interposer, according to an example embodiment of the inventive concept.

Referring to FIG. 9, in operation S300, logic synthesis may be performed on a semiconductor package design including a semiconductor intellectual property (IP) block such as a digital logic (e.g., a central processing unit (CPU)

or a graphics processing unit (GPU)) or a memory (e.g., an HBM). In operation S310, a netlist of the semiconductor package design may be generated. In operation S320, components may be arranged by considering signals and power of the semiconductor package design, and routing for connection of the components may be performed. In operation S330, the netlist and a layout of the semiconductor package design may be generated. In operation S340, resistance capacitance (RC) and interconnect may be extracted from the semiconductor package design. In operation S350, a current resistance drop (IRD) indicating a dropping value of a current I by a resistance R, which does not vary along time, and a dynamic voltage drop (DVD) indicating a dropping value of a voltage by an impedance, which varies along time, may be analyzed with respect to the semiconductor package design. In operation S360, the signals and the power of the semiconductor package design may be analyzed. In operation S370, design rule check (DRC)/library vs schematic (LVS) (connectivity check)/electrostatic discharge (ESD) (anti-electrostatic circuit check)/design for manufacturing (DFM) (check whether a manufacturing (or process)-enabled design is performed) may be performed on the semiconductor package design. Thereafter, operation S130 of FIG. 1 may be performed.

According to an example embodiment of the inventive concept, in operations S320, S360, and the like, electrical properties of a configuration of the 2.5D interposer in the semiconductor package may be extracted, characteristics of the semiconductor package may be analyzed based on the extracted electrical properties, and the analyzed characteristics may be reflected on a semiconductor package design. According to an embodiment of the inventive concept, the characteristics of the semiconductor package may include at least one of signal integrity and power integrity.

Figure 10:
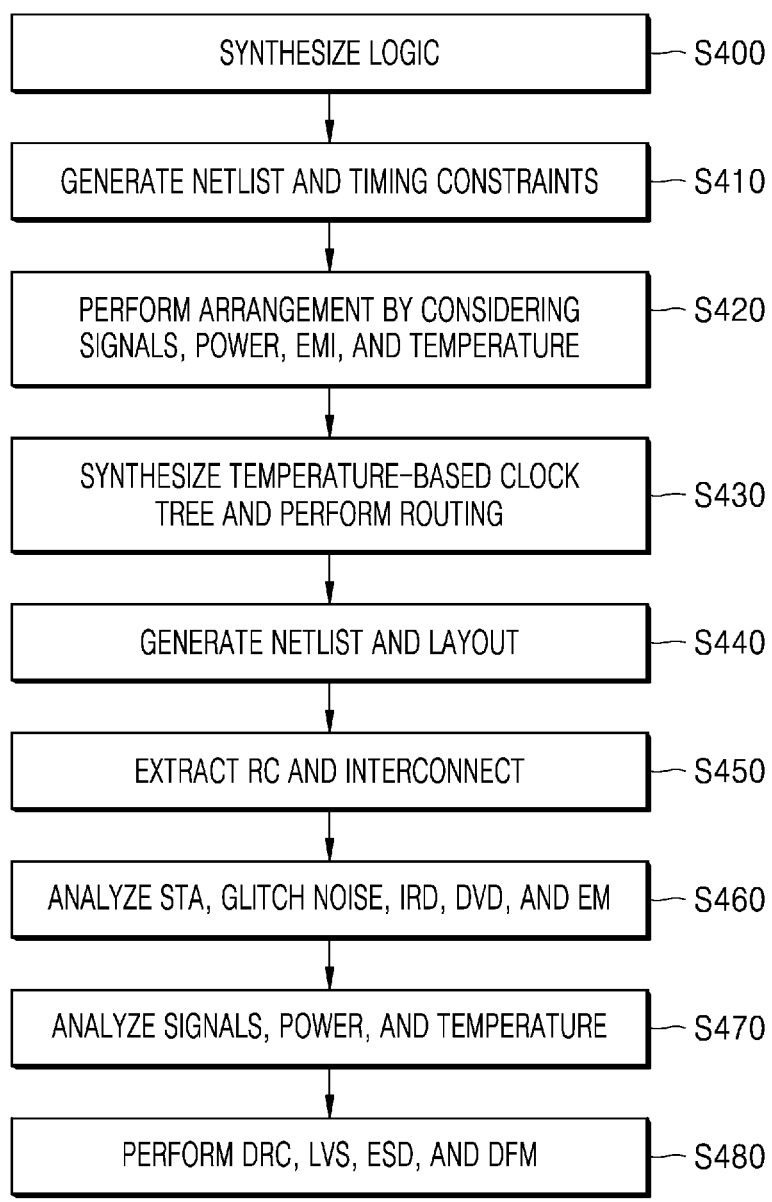
FIG. 10 is a flowchart of a method of designing a semiconductor package including a chip having a plurality of dies stacked vertically, according to an example embodiment of the inventive concept.

FIG. 10 is a flowchart of a method of designing a semiconductor package including a chip having a plurality of dies stacked vertically, according to an example embodiment of the inventive concept.

Referring to FIG. 10, in operation S400, logic synthesis may be performed on a semiconductor package design including a semiconductor IP block such as a digital logic or a memory. In operation S410, a netlist of the semiconductor package design and timing constraint elements for static timing analysis may be generated. In operation S420, components may be arranged by considering signals, power, electromagnetic interference (EMI), and a temperature of the semiconductor package design. In operation S430, a temperature-based clock tree may be synthesized, and routing for connection of the components of the semiconductor package design may be performed. In operation S440, the netlist and a layout of the semiconductor package design may be generated. In operation S450, RC and interconnect may be extracted from the semiconductor package design. In operation S460, static timing analysis (STA), glitch noise, IRD, DVD, electro migration (EM) (a phenomenon that power/signal routing is deteriorated by a current), and jitter may be analyzed (or checked) with respect to the semiconductor package design. In operation S470, signals, power, and a temperature of the semiconductor package design may be analyzed. In operation S480, TSV-based DRC, LVS, ESD, and DFM may be performed on the semiconductor package design. Thereafter, operation S130 of FIG. 1 may be performed.

According to an example embodiment of the inventive concept, in operations S420, S470, and the like, electrical properties of a configuration of the chip having the plurality of dies stacked vertically in the semiconductor package may be extracted, characteristics of the semiconductor package may be analyzed based on the extracted electrical properties, and the analyzed characteristics may be reflected on a semiconductor package design. According to an embodiment of the inventive concept, the characteristics of the semiconductor package may include at least one of signal integrity and power integrity.

Figure 11:
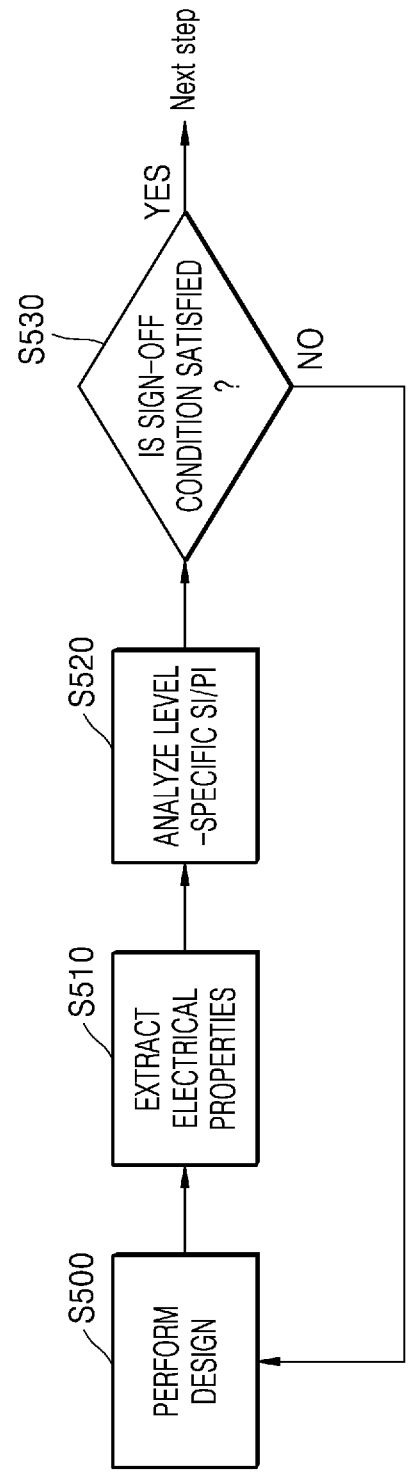
FIG. 11 is a flowchart of a semiconductor package design method, according to an example embodiment of the inventive concept.

FIG. 11 is a flowchart of a semiconductor package design method according to an example embodiment of the inventive concept.

Referring to FIG. 11, in operation S500, a design of a semiconductor package may be performed. In operation S510, a plurality of electrical properties of a stack structure of the semiconductor package may be extracted. In operation S520, chip design level-specific SI/PI with respect to the stack structure of the semiconductor package may be analyzed based on the extracted electrical properties. In operation S530, it may be determined whether the SI or the PI satisfies a sign-off condition. When the determination result in operation S530 is 'NO', a design of a semiconductor package may be performed again in operation S500, and in this case, the analysis result in operation S520 may be reflected on the design. When the determination result in operation S530 is 'YES', a next design step may be performed.

As described above, the semiconductor package design method according to an example embodiment of the inventive concept may exhibit an effect that a semiconductor package having improved performance is efficiently and quickly designed by analyzing characteristics of a stack structure of the semiconductor package and applying the analysis result to a design as feedback.

Figure 12:
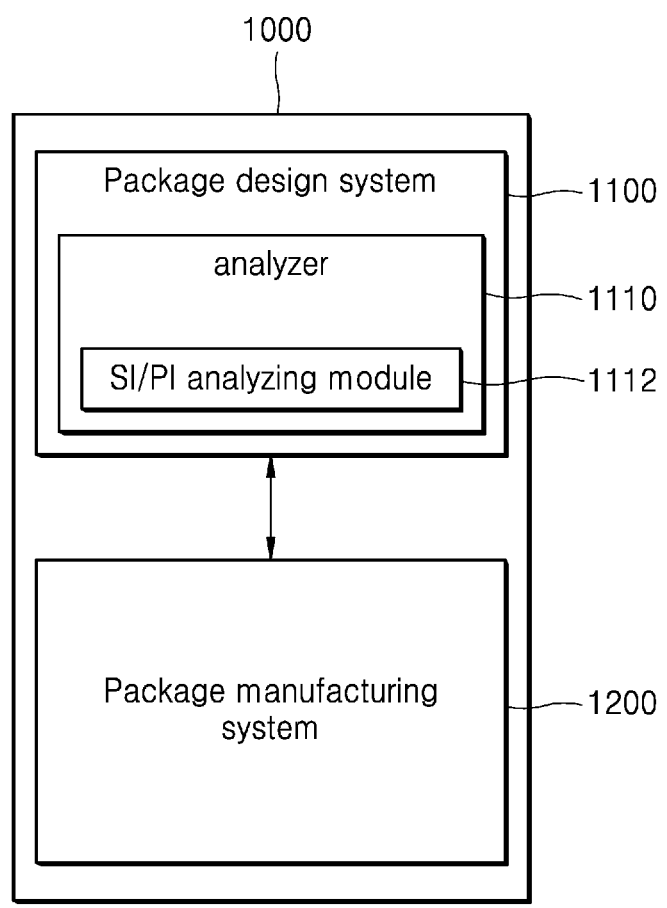
FIG. 12 is a block diagram of a semiconductor package manufacturing apparatus, according to an example embodiment of the inventive concept.

FIG. 12 is a block diagram of a semiconductor package manufacturing apparatus 1000 according to an example embodiment of the inventive concept.

Referring to FIG. 12, the semiconductor package manufacturing apparatus 1000 may include a semiconductor package design system 1100 to which the embodiments described with reference to FIGS. 1 to 11 and a semiconductor package manufacturing system 1200. The semiconductor package design system 1100 may include an analyzer 1110, and the analyzer 1110 may include an SI/PI analyzing module 1112. The analyzer 1110 may extract electrical properties of a stack structure of a semiconductor package through the SI/PI analyzing module 1112, and may analyze SI or PI of the stack structure based on the extracted electrical properties. The semiconductor package design system 1100 may design an optimized semiconductor package of a stack structure by reflecting the analysis result on a semiconductor package design. The semiconductor package manufacturing system 1200 may manufacture a semiconductor package according to a final layout output by the semiconductor package design system 1100. According to some example embodiments of the inventive concept, the semiconductor package design system 1100 may be embedded in the semiconductor package manufacturing apparatus 1000, and the semiconductor package design system 1100 and the semiconductor package manufacturing system 1200 may interact with each other to manufacture a semiconductor package.

Figure 13:
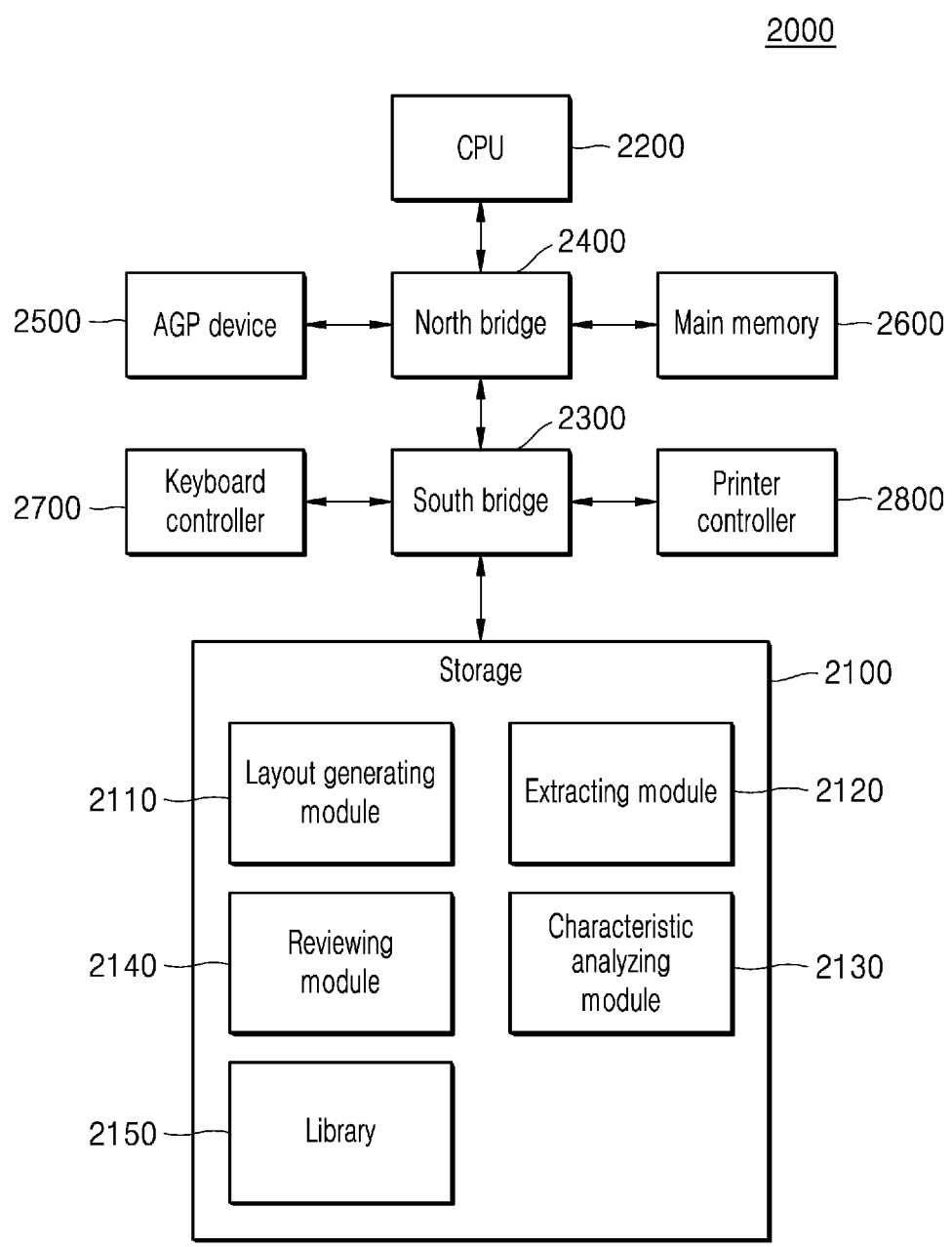
FIG. 13 is a block diagram of a computing system to which a semiconductor package design system is applied, according to an example embodiment of the inventive concept.

FIG. 13 is a block diagram of a computing system 2000 to which a semiconductor package design system is applied, according to an example embodiment of the inventive concept. Hereinafter, described is an example in which the semiconductor package design system according to the embodiments described with reference to FIGS. 1 to 11 is implemented by software or the like and applied to the computing system 2000.

Referring to FIG. 13, the computing system 2000 may include a storage 2100, a CPU 2200, a south bridge (or southbridge) 2300, a north bridge (or northbridge) 2400, an accelerated graphics port (AGP) device 2500, a main memory 2600, a keyboard controller 2700, and a printer controller 2800.

The CPU 2200, the AGP device 2500, and the main memory 2600 may be connected to the north bridge 2400. The AGP device 2500 may be a bus standard enabling a three-dimensional graphic representation to be quickly implemented, and the AGP device 2500 may include a video card configured to reproduce a monitor image, or the like. The CPU 2200 may perform various arithmetic operations necessary to operate the computing system 2000 and may also execute an operating system and an application program. The main memory 2600 may load and store data necessary to perform an operation of the CPU 2200 from the storage 2100. The main memory 2600 may be implemented by dynamic random access memory (DRAM), but the inventive concept is not limited thereto.

The storage 2100, the keyboard controller 2700, the printer controller 2800, and various kinds of peripheral devices (not shown) may be connected to the south bridge 2300. The storage 2100 is a large-capacity data storage device storing data and the like and may be implemented by a computer-readable recording medium, but the inventive concept is not limited thereto.

According to an example embodiment of the inventive concept, the storage 2100 may store therein a layout generating module 2110, an extracting module 2120, a characteristic analyzing module 2130, a reviewing module 2140, and a library 2150. The CPU 2200 may read the layout generating module 2110, the extracting module 2120, the characteristic analyzing module 2130, the reviewing module 2140, and the library 2150 from the storage 2100 and design a semiconductor package. A detailed description thereof is the same as described with reference to FIGS. 1 to 11 and is thus omitted herein.

While the inventive concept has been particularly shown and described with reference to embodiments thereof, it will be understood that various changes in form and details may be made therein without departing from the spirit and scope of the following claims.

What is claimed is:

1. A method of manufacturing a semiconductor package comprising a first chip, a second chip, a 2.5 dimensional (2.5D) interposer, a package substrate, and a board, the method comprising:
generating a layout including the 2.5D interposer on the package substrate and the first and second chips individually arranged on the 2.5D interposer, based on design information;
analyzing signal integrity and power integrity between the first and second chips from the layout;
analyzing signal integrity or power integrity between the first chip and at least one third chip on the board from the layout;
determining whether to modify the layout, based on analysis results of the analyzing the signal integrity and the power integrity between the first and second chips and the analyzing the signal integrity or the power integrity between the first chip and at least one third chip on the board; and forming the semiconductor package including the first chip, the second chip, the 2.5D interposer, the package substrate, and the board, when it is determined not to modify the layout.

2. The method of claim 1, wherein the analyzing of the signal integrity and the power integrity between the first and second chips further comprises:
extracting first electrical properties of a configuration of the 2.5D interposer; and
generating the signal integrity and the power integrity by using the extracted first electrical properties.

3. The method of claim 2, wherein the configuration of the 2.5D interposer comprises a plurality of through silicon vias (TSVs), a plurality of vias, and a plurality of metal lines.

4. The method of claim 2, wherein the generating of the signal integrity and the power integrity between the first and second chips further comprises:
generating, from the extracted first electrical properties, the signal integrity by using at least one of an impedance, skew, return loss, insertion loss, and crosstalk (X-talk) of a first configuration of the 2.5D interposer for communication between the first chip and the second chip; and
generating, from the extracted first electrical properties, the power integrity by using at least one of simultaneous switching noise (SSN), a resistance, and an impedance of a second configuration of the 2.5D interposer for supplying power to the first and second chips.

5. The method of claim 1, wherein the analyzing of the signal integrity or the power integrity between the first chip and the at least one third chip further comprises:
extracting second electrical properties of a configuration of the 2.5D interposer; and
generating the signal integrity or the power integrity by using the extracted second electrical properties.

6. The method of claim 5, wherein the configuration of the 2.5D interposer comprises a plurality of through silicon vias (TSVs), a plurality of vias, a plurality of meshes, and a plurality of bumps for connection to the package substrate.

7. The method of claim 5, wherein the generating of the signal integrity or the power integrity between the first chip and the at least one third chip further comprises:
generating, from the extracted second electrical properties, the signal integrity by using a capacitance or insertion loss of a first configuration of the 2.5D interposer for communication between the first chip and the at least one third chip.

8. The method of claim 5, wherein the generating of the signal integrity or the power integrity between the first chip and the at least one third chip further comprises:
generating, from the extracted second electrical properties, the power integrity by using at least one of a resistance and an impedance of a second configuration of the 2.5D interposer for supplying power from the at least one third chip to the first chip.

9. The method of claim 1, wherein the determining of whether to modify the layout further comprises:
determining that the layout is to be modified when the analysis results do not satisfy a sign-off condition; and
modifying the design information based on the analysis results.

10. The method of claim 9, wherein the generating of the layout further comprises:
re-generating the layout based on the modified design information.

11. A method of manufacturing a semiconductor package comprising a first chip having a plurality of dies stacked vertically, a package substrate, and a board, the method comprising:
- generating a layout comprising the first chip on the package substrate;
- analyzing signal integrity and power integrity between the plurality of dies of the first chip from the layout;
- analyzing signal integrity or power integrity between the first chip and at least one second chip on the board from the layout;
- modifying the layout based on analysis results of the analyzing the signal integrity and the power integrity between the plurality of dies of the first chip and the analyzing the signal integrity or the power integrity between the first chip and at least one second chip on the board; and
- forming the semiconductor package including the first chip having a plurality of dies stacked vertically, the package substrate, and the board, based on the modified layout.

12. The method of claim 11, wherein the analyzing of the signal integrity and the power integrity between the plurality of dies further comprises:
- extracting first electrical properties of a configuration of the first chip; and
- generating the signal integrity and the power integrity by using the extracted first electrical properties.

13. The method of claim 12, wherein the configuration of the first chip comprises a plurality of through silicon vias (TSVs), a plurality of vias, and a plurality of metal lines corresponding to each of the plurality of dies.

14. The method of claim 12, wherein the analyzing of the signal integrity and the power integrity between the plurality of dies further comprises:
- generating, from the extracted first electrical properties, the signal integrity by using at least one of an impedance, skew, return loss, insertion loss, and crosstalk (X-talk) of a first configuration of the first chip for communication between the plurality of dies; and
- generating, from the extracted first electrical properties, the power integrity by using at least one of simultaneous switching noise (SSN), a resistance, and an impedance of a second configuration of the first chip for supplying power to the plurality of dies.

15. The method of claim 11, wherein the analyzing of the signal integrity or the power integrity between the first chip and the at least one second chip further comprises:
- extracting second electrical properties of a configuration of the first chip; and
- generating the signal integrity or the power integrity by using the extracted second electrical properties.

16. The method of claim 15, wherein the generating of the signal integrity or the power integrity between the first chip and the at least one second chip further comprises:
- generating, from the extracted second electrical properties, the signal integrity by using a capacitance or insertion loss of a first configuration of the first chip for communication between each of the plurality of dies and the at least one second chip.

17. The method of claim 15, wherein the generating of the signal integrity or the power integrity between the first chip and the at least one second chip further comprises:
- generating, from the extracted second electrical properties, the power integrity by using at least one of a resistance and an impedance of a second configuration of the first chip for supplying power to each of the plurality of dies.

18. The method of claim 11, wherein the generating of the layout further comprises:
- stacking the plurality of dies according to positions determined based on at least one of a temperature parameter, a power consumption parameter, and a noise parameter of each of the plurality of dies in the first chip.

19. A design system for designing a semiconductor package comprising a first chip, a second chip, a 2.5 dimensional (2.5D) interposer, a package substrate, and a board, the design system comprising:
- a layout generating module configured to generate a first layout comprising the 2.5D interposer on the package substrate and the first and second chips individually arranged on the 2.5D interposer;
- an extracting module configured to extract first electrical properties and second electrical properties of a configuration of the 2.5D interposer from the first layout;
- a characteristic analyzing module configured to analyze signal integrity and power integrity between the first and second chips based on the extracted first electrical properties and analyze signal integrity or power integrity between the first chip and at least one third chip on the board based on the extracted second electrical properties; and
- a reviewing module configured to modify the first layout based on analysis results of the signal integrity and the power integrity between the first and second chips and the signal integrity or the power integrity between the first chip and at least one third chip on the board.

20. The design system of claim 19,
- wherein the semiconductor package further comprises a fourth chip having a plurality of dies stacked vertically,
- wherein the layout generating module is further configured to generate a second layout comprising the fourth chip on the package substrate,
- wherein the extracting module is further configured to extract third electrical properties and fourth electrical properties of a configuration of the plurality of dies in the fourth chip from the second layout,
- wherein the characteristic analyzing module is further configured to analyze signal integrity and power integrity between the plurality of dies in the fourth chip based on the extracted third electrical properties and analyze signal integrity or power integrity between the fourth chip and the at least one third chip on the board based on the extracted fourth electrical properties; and
- wherein the reviewing module is configured to modify the second layout based on the analysis results corresponding to the second layout.

* * * * *